(12) United States Patent
Galpin et al.

(10) Patent No.: US 10,491,899 B2
(45) Date of Patent: Nov. 26, 2019

(54) METHOD AND APPARATUS FOR QUANTIZATION IN VIDEO ENCODING AND DECODING

(71) Applicant: InterDigital VC Holdings, Inc., Wilmington, DE (US)

(72) Inventors: Franck Galpin, Thorigne-Fouillard (FR); Hadrien Gurnel, Paris (FR); Edouard Francois, Bourg des Comptes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/755,460

(22) PCT Filed: Sep. 2, 2016

(86) PCT No.: PCT/EP2016/070711
§ 371 (c)(1),
(2) Date: Feb. 26, 2018

(87) PCT Pub. No.: WO2017/037228
PCT Pub. Date: Mar. 9, 2017

(65) Prior Publication Data
US 2018/0255302 A1   Sep. 6, 2018

(30) Foreign Application Priority Data
Sep. 2, 2015   (EP) .................................... 15306348

(51) Int. Cl.
*H04N 19/126*   (2014.01)
*H04N 19/186*   (2014.01)
(Continued)

(52) U.S. Cl.
CPC ......... *H04N 19/126* (2014.11); *H04N 19/124* (2014.11); *H04N 19/159* (2014.11); *H04N 19/186* (2014.11); *H04N 19/463* (2014.11)

(58) Field of Classification Search
CPC .. H04N 19/124; H04N 19/126; H04N 19/159; H04N 19/186; H04N 19/463
See application file for complete search history.

(56) References Cited

U.S. PATENT DOCUMENTS

| 5,629,780 A | 5/1997 | Watson |
| 6,363,113 B1 | 3/2002 | Faryar et al. |
(Continued)

FOREIGN PATENT DOCUMENTS

| EP | 2618574 | 7/2013 |
| EP | 2675162 A2 | 12/2013 |
| WO | WO 2015072754 A1 | 5/2015 |

OTHER PUBLICATIONS

Zhang et al:"High dynamic range video compression by intensity dependent spatial quantization in HEVC", 2013 Picture Codeing Symposium, IEEE, Dec. 8, 2013, pp. 353-356.
(Continued)

*Primary Examiner* — Hee-Yong Kim
(74) *Attorney, Agent, or Firm* — Brian J. Dorini; Xiaoan Lu

(57) ABSTRACT

Because human eyes may become less sensitive to dark areas around very bright areas in a video (known as glare masking), we may use coarser quantization in such dark areas. Considering the extra distortion that human eyes can tolerate in a block with glare masking, a quantization ratio for the block can be calculated. The quantization parameter for the block can then be scaled up using the quantization ratio to form an adjusted quantization parameter. In one embodiment, the adjusted quantization parameter can be derived at the decoder side, and thus, transmission of
(Continued)

quantization ratio information is not needed. In particular, we can estimate the luminance of a current block based on a predicted block and de-quantized DC coefficient, and use the luminance of causal neighboring blocks and the estimated luminance of the current block to estimate the adjusted quantization parameter.

20 Claims, 8 Drawing Sheets

(51) Int. Cl.
*H04N 19/159* (2014.01)
*H04N 19/463* (2014.01)
*H04N 19/124* (2014.01)

(56) References Cited

U.S. PATENT DOCUMENTS

| | | | |
|---|---|---|---|
| 8,265,418 B2 | 9/2012 | Gomi et al. | |
| 2004/0005077 A1* | 1/2004 | Bilobrov | H04N 19/61 382/100 |
| 2011/0235715 A1* | 9/2011 | Chien | H04N 19/176 375/240.16 |
| 2014/0029665 A1* | 1/2014 | Damkat | H04N 19/172 375/240.03 |
| 2015/0043815 A1* | 2/2015 | Tan | H04N 19/147 382/166 |
| 2015/0063461 A1 | 3/2015 | Zheng | |
| 2016/0316205 A1* | 10/2016 | Lasserre | H04N 19/124 |

OTHER PUBLICATIONS

Naccari et al:"Improving HEVC compression efficiency by intensity dependant spatial quantisation", JCTVC-J0076, 10th Meeting; Stockholm, Jul. 11-20, 2012.

Naccari et al:"On Just Noticeable Distortion Quantization in the HEVC Codec", JCTVC-H0477, 8th Meeting; San Jose, Feb. 1-10, 2012.

Naccari et al:"On intensity Dependent Quentisation in the HEVC codec", JCTVC-I0257, 9th Meeting; Geneva Apr. 17-May 7, 2012.

Kim et al:"A joint JND model based on luminance and frequency masking for HEVC", JCTVC-I0163, 9th Meeting; Geneva, Apr. 27-May 7, 2012.

Kim et al:"An HEVC-Compliant Perceptual Video Coding Scheme based on Just Noticeable Difference Models", PCS 2013, 30th Picture Coding Symposium, Dec. 8, 2013, pp. 1-5.

Haque et al: "HVS Model based Default Quantization Matrices", JCTVC-G0880, 7th Meeting; Geneva Nov. 21-30, 2011.

International Search Report for PCT/EP2016070711 dated Oct. 18, 2016.

* cited by examiner

METHOD AND APPARATUS FOR QUANTIZATION IN VIDEO ENCODING AND DECODING

This application claims the benefit, under 35 U.S.C. § 371 of International Application No. PCT/EP2016/070711, filed Sep. 2, 2016, which was published on Mar. 9, 2017, which claims the benefit of European Patent Application No. EP15306348.2 filed Sep. 2, 2015.

TECHNICAL FIELD

This invention relates to a method and an apparatus for video encoding and decoding, and more particularly, to a method and an apparatus for adjusting a quantization parameter based on glare masking effects when encoding and decoding videos.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

HDR (High Dynamic Range) videos generally represent a greater range of luminance levels than that can be achieved by conventional SDR (Standard Dynamic Range) videos, which usually have a 8- or 10-bit dynamic range. To compress or represent HDR videos, as shown in FIG. 1, some existing methods first perform forward conversion (110), which may include a conversion from HDR linear signals to non-linear signals, color space conversion, bit-depth reduction/quantization, and chroma down-conversion. The signals after forward conversion can then be compressed using a video encoder (120), for example, an HEVC (High Efficiency Video Encoding) encoder that supports 8-bit and 10-bit video formats. At the decoder side, the bitstream is decoded using a video decoder (130), for example, an HEVC decoder, and then is converted to HDR video signals using backward conversion (140), which may include color space conversion, bit-depth inverse quantization, chroma up-conversion, and conversion from non-linear signals to HDR linear signals.

SMPTE 2084 defines a transfer function that takes into account the sensitivity of the HVS (Human Visual System) to luminance, which applies an OETF (Opto-Electronic Transfer Function) curve to each pixel independently. The forward conversion module (110) may use the OETF curve and bit-depth quantization to transform the HDR videos to video signals represented with fewer bits, for example, to 10 or 12-bit signals according to SMPTE 2084, and the backward conversion module (140) may use an inverse OETF curve that corresponds to the OETF curve, for example, the Perceptual Quantizer (PQ) EOTF curve.

SUMMARY

A method of encoding a video is presented, comprising: accessing a block of an image of said video; encoding said block based on a quantization parameter for said block, said quantization parameter being determined based on luminance of said block and luminance of neighboring blocks of said block, wherein said luminance of said block is determined using at least one transform coefficient in said block; and generating a bitstream responsive to the encoding.

In one embodiment, said quantization parameter is determined based on a glare masking effect between one or more pixels of said neighboring blocks of said block and one or more pixels of said block. In one example, a glare factor related to the glare masking effect can be calculated as Eqs. (4) and (5) of the detailed description.

In another embodiment, the method further comprises: determining a JND (Just Noticeable Difference) for a pixel of said block responsive to said glare masking effect, wherein said quantization parameter is determined based on said determined JND and said luminance of said block. For example, said JND can be determined using Eqs. (2)-(3) of the detailed description.

In another embodiment, said luminance of said block is determined using a DC transform coefficient of said block and a predicted block for said block.

In another embodiment, quantization of AC transform coefficients of said block is based on said determined quantization parameter, and quantization of said DC transform coefficient is based on another quantization parameter.

In another embodiment, the method further comprises: determining a quantization ratio based on said luminance of said block and said luminance of neighboring blocks of said block, wherein said quantization parameter is determined based on a second quantization parameter and said quantization ratio. In one example, said quantization ratio can be determined as described in Eqs. (7)-(9) in the detailed description.

The present embodiments also provide an apparatus for encoding a video, comprising a memory and one or more processors configured to perform any of the methods described above.

The present embodiments also provide a non-transitory computer readable storage medium having stored thereon a bitstream generated according to any of the methods described above.

A method of decoding a video from a bitstream is presented, comprising: accessing said bitstream representing said video; decoding said block based on a quantization parameter for a block of an image of said video, said determined quantization parameter being determined based on luminance of said block and luminance of neighboring blocks of said block, wherein said luminance of said block is determined using at least one transform coefficient in said block; and outputting said video to at least one of a display, a storage, and a communication interface.

According to one embodiment, said luminance of said block is determined using a DC transform coefficient of said block and a predicted block for said block.

In another embodiment, de-quantization of AC transform coefficients of said block is based on said determined quantization parameter, and de-quantization of said DC transform coefficient is based on another quantization parameter.

In another embodiment, the method further comprises determining a quantization ratio based on said luminance of said block and said luminance of neighboring blocks of said block, wherein said quantization parameter is determined based on a second quantization parameter and said quantization ratio. In one example, said quantization ratio can be determined as described in Eqs. (7)-(9) in the detailed descriptions.

The present embodiments also provide an apparatus for decoding a bitstream, comprising a memory and one or more processors configured to perform any of the methods described above.

The present embodiments also provide a non-transitory computer readable storage medium having stored thereon instructions for performing any of the methods described above.

A bitstream is presented, formatted to include: a block of an image of said video, encoded based on a quantization parameter, said quantization parameter being determined based on luminance of said block and luminance of neighboring blocks of said block, wherein said luminance of said block is determined using at least one transform coefficient in said block.

DETAILED DESCRIPTION

Figure 1:
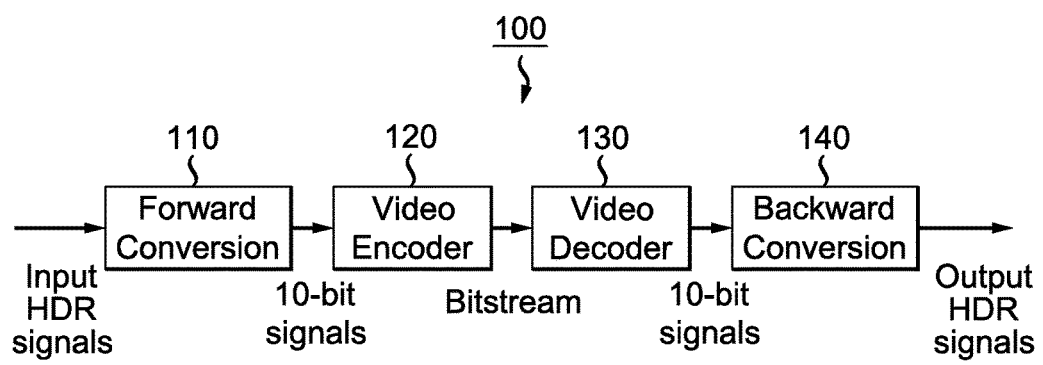
FIG. 1 is a block diagram illustrating an exemplary framework of encoding and decoding HDR signals.

The present principles are directed to quantization adjustment based on HVS characteristics for video encoding and decoding. It should be noted that quantization may be used at different stages in representing the videos. Referring back to the example shown in FIG. 1, quantization is used in forward conversion to reduce the bit depth, and also used in the video encoder to quantize the transform coefficients. Similarly, inverse quantization is used in backward conversion to increase the bit depth and in the video decoder to de-quantize the transform coefficients.

Because the human eyes may become less sensitive to dark areas around the very bright areas in the videos (known as glare masking or luminance masking), we may use coarser quantization (i.e., preserving less detail or removing more detail) in such dark areas. In one embodiment, we can use an additional quantization process in the forward conversion or adjust the bit-depth quantization within the forward conversion. In another embodiment, we adjust quantization parameters used in the video encoder and decoder.

The glare masking is more common in HDR videos and can also be seen in SDR videos, for example, when an SDR or LDR (Low Dynamic Range) video is displayed by a TV set with strong backlight and high contrast. To compress SDR videos, a framework similar to the one shown in FIG. 1 can be used, with modifications to the forward conversion and backward conversion. The forward conversion module (110) may include a conversion from the input SDR linear signals to non-linear signals, for example, using a gamma transfer function as described in SMPTE BT709, a color space conversion, bit-depth reduction/quantization, and a chroma down-conversion. The backward conversion module (140), which converts the decoded signal to SDR video signals, may include color space conversion, bit-depth inverse quantization, chroma up-conversion, and conversion from non-linear signals to SDR linear signals, for example, using an inverse gamma transfer function. Note that in most cases, the signal before the inverse gamma processing can be sent to the display. In the following, we may discuss exemplary embodiments using HDR signals, but the present principles can also be applied to SDR signals.

Figure 2A:
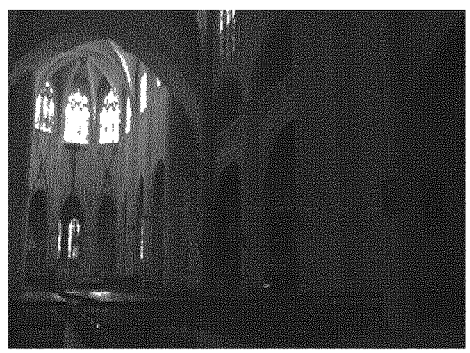
FIG. 2A is a pictorial example illustrating an exemplary HDR image.
Figure 2B:
FIG. 2B is a pictorial example illustrating the glare masking effect in the exemplary HDR image.

FIG. 2A shows an exemplary HDR image, and FIG. 2B shows the glare masking effect in the exemplary HDR image. In FIG. 2B, black areas denote regions where masking is low, namely, human eyes are more sensitive to distortion in this region, and white areas denote the regions where masking is high. From FIG. 2B, we can observe that the bright windows induce strong masking on dark and nearby areas, and the masking effect attenuates as the distance to the window increases.

We may use JND (Just Noticeable Difference) to measure the glare masking effect. JND denotes the level of distortion that can be tolerated in an image or video because it is imperceptible by a human observer. In the branch of experimental psychology focused on sensation and perception (psychophysics), the JND is the amount something must be changed in order for a difference to be noticeable, detectable at least half the time. It is also known as the difference limen, differential threshold, or least perceptible difference. The JND is subjective, and many JND models are available. In the context of the present application, two different JNDs are defined: $JND_L$ and $JND_G$, as described in further detail below. More generally, other distortion or quality metrics, for example, one that takes into account neighboring information, can be used in place of JND measures.

$JND_L$ $JND_L$ corresponds to the JND of one pixel without considering the glare masking. $JND_L$ depends only on the luminance of the current pixel. Indeed, $JND_L$ describes the variation of luminance that should exist at the current pixel of the image so that the human eye is able to notice the variation at the current pixel, without considering glare masking.

The $JND_L$ can be determined experimentally. For example, for a given luminance L, we can find a value dL that represents the minimum delta in luminance for a human observer to see the change. These values are typically given as a mapping table between L and dL.

In another embodiment, The $JND_L$ can be determined from the PQ OETF curve for HDR signals, or the OETF defined in BT709 and the target peak luminance for SDR signals. The OETF curve aims at mapping a linear signal (L) into a non-linear signal (Y) using a transfer function TF( ):

$$TF(L)=Y. \quad (1)$$

For HDR signal, the transfer function, for example, a PQ curve, can be designed such that $TF(L+0.9*JND(L)) \approx Y+1$ (i.e., a step of 0.9*JND in the linear signal L is less or equal to a step of 1 for the non-linear signal Y). Thus, we may deduce $JND_L$ from the TF curve as:

$$JND_L(L)=TF^{-1}(Y+1)-TF^{-1}(Y)=TF^{-1}(TF(L)+1)-TF^{-1}(TF(L)). \quad (2)$$

In the present application, we call the space in which the linear signal (L) is disposed as the linear space, and call the space in which the non-linear signal (Y) is disposed as the perceptual space. In the linear space, the luminance value of a pixel is directly proportional to the physical luminance (for example expressed in nits, or candela per meter square (cd/m2)). In the perceptual space, the aim is to have the luminance of a pixel be linear with respect to the human visual system, i.e., a same amount of difference of luminance (dL) in this space should be perceived as a same amount of difference of luminance to human eyes, regardless of the pixel luminance L. The perceptual space is defined experimentally and is subjective. Several perceptual spaces are available as known to those skilled in the art.

$JND_G$ $JND_G$ corresponds to the JND of one pixel considering glare masking, due to bright neighboring pixels. In this situation, $JND_G$ depends on the luminance of the current pixel and the luminance of neighboring pixels. Indeed, it describes the minimal variation of luminance that should exist at the current pixel so that the human eye is able to notice a difference of luminance at the current pixel considering the effects of glare masking.

$JND_G$ can be determined experimentally, for example, given a luminance, a bright spot and a distance to the current pixel, a mapping table can be obtained. Then modeling can be used to obtain an analytical function to best fit the mapping.

In another embodiment, we compute the $JND_L$ and a glare factor (Gf) that considers the glare masking effect. Mathematically, the computation of $JND_G$, based on the masking effect from bright areas to dark areas, can be described as:

$$JND_G=Gf*JND_L. \quad (3)$$

By definition, the Gf factor is greater than 1 (i.e., a pixel cannot have a $JND_G$ that is smaller than the $JND_L$). The Gf factor depends on the luminance of the current pixel, the luminance of surrounding pixels, and their position (distance) relative to the current pixel.

In the following, luminance values are expressed in the linear space (for example in nits or cd/m2). If the video input is expressed in the perceptual space (for example after an OETF function), the inverse function can be applied to the intensity value of the pixel, in order to obtain the linear luminance value.

The modeling of the glare factor can be complex depending on the HVS model that is used to consider glare masking. Here, we introduce a tractable and simple way to model the glare factor, based upon the modeling of the results obtained during subjective psycho-visual tests. Specifically, the glare factor of pixel $p_1$, which is affected by pixel $p_2$ (with $L(p_2) > L(p_1)$) can be calculated as:

$$Gf(p_1,p_2)=\max\{1,[a_0+(L(p_2)-L(p_1))^{a_1}] \cdot [(L(p_2)-L(p_1))*a_2*d(p_1,p_2)+a_3]\} \quad (4)$$

where $L(p)$ is the luminance of pixel p, $d(p_1,p_2)$ is the Euclidian distance between pixels $p_1$ and $p_2$, and $[a_0 \ldots a_3]$ are constants, determined empirically throughout subjective tests. A typical set of values for $[a_0 \ldots a_3]$ can be, for example: [6.75, 0.352, −3.74e-008, 3.360e-005] when SMPTE 2084 OETF is used. The values can be adapted if another OETF is used, for example, when the gamma transfer function defined in SMPTE BT709 is used for SDR signals.

According to the above glare factor model, the glare factor decreases with the distance because $a_2$ is negative, increases when pixel $p_2$ is brighter, and increases when $p_1$ is darker, consistent with the perception of the glare masking effect.

To reduce computation complexity, the above computation for pixels can be simplified. For example, we may only compute glare factors for "dark" pixels, namely, pixels with the darkness below a threshold (typically 100 nits), and we may only compute the contribution to masking for "bright" pixels, namely, pixels with brightness above a threshold (typically 1000 nits). For those pixels that the computation is skipped, we set Gf to 1 (i.e., $JND_G=JND_L$).

In the above, we illustrate how to compute the glare factor for individual pixels of the input image. We consider masking as an additive phenomenon (up to a certain threshold). Thus, to compute the total glare factor for a given pixel, the contribution of all other pixels can be aggregated, according to:

$$Gf(p)=\min(M,\Sigma_{p_i}Gf(p,p_i)) \quad (5)$$

where $p_i$ represents the neighbors of pixel p, and M is an empirical threshold above which masking saturates, in one example, we set M=20. When there is no processing time constraints, the whole image can be considered as the neighbors of pixel p. To reduce computation, we may consider a smaller set of pixels as the neighbors of pixel p, for example, pixels whose brightness is above a threshold and who are close enough, for example, from Eq. (3), we can deduce a threshold of the distance for which a bright pixel will not contribute anymore to the Gf factor, i.e., when $[a_0+(L(p_2)-L(p_1))^{a_1}] \cdot [(L(p_2)-L(p_1))*a_2*d(p_1,p_2)+a_3]$ is below 1.

Figure 3:
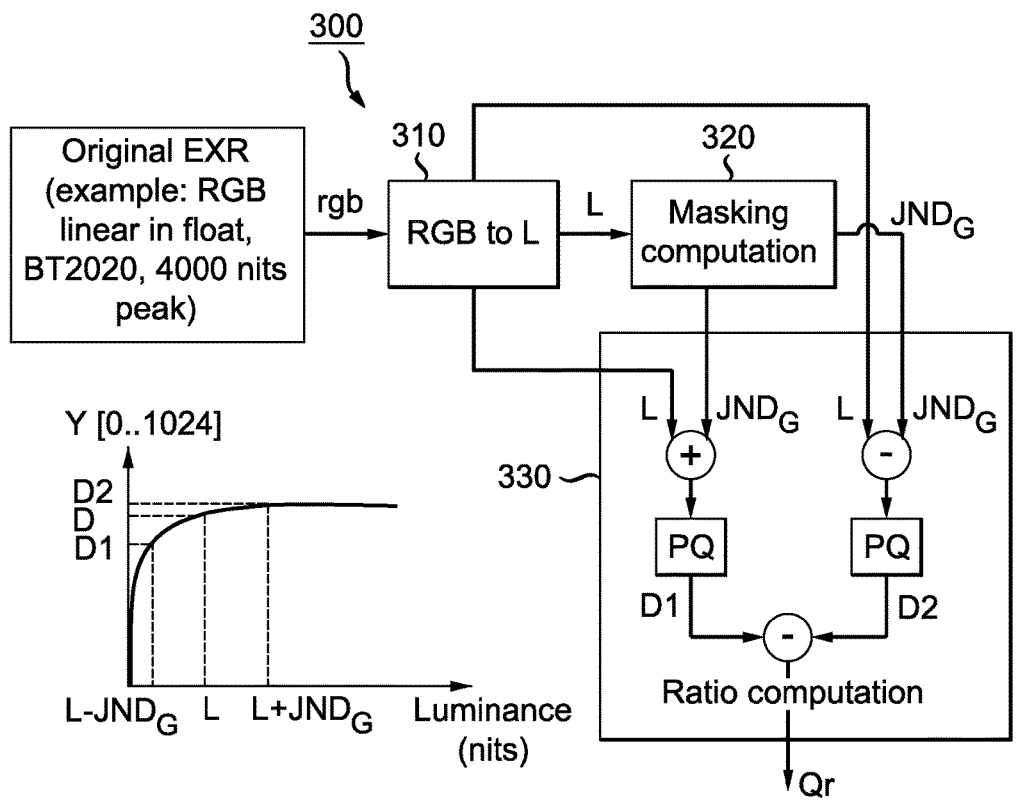
FIG. 3 illustrates an exemplary framework for using the glare masking effect to calculate the quantization ratio, according to an embodiment of the present principles.

FIG. 3 illustrates an exemplary method 300 for calculating a quantization ratio based on the glare masking effect, according to an embodiment of the present principles.

Method 300 accesses an original video (for example using the OpenEXR file format as defined by the SMPTE 2065-4:2013) in a linear space as input. The original image can be, for example, in a RGB linear format represented by floating points using the BT2020 format for the primaries with 4000 nits as peak luminance. From the original image, the luminance value (L) can be calculated in order to consider glare masking (310). For example, an input RGB (linear space, floating values in nits) image $I_{rgb}$ can be converted from RGB BT2020 color space to XYZ color space as:

$$L=0.262700R+0.677998G+0.059302B. \quad (6)$$

Then for individual pixels, we can calculate $JND_G$ (320), for example, using Eq. (3). Specifically, we may calculate $JND_L$ from L using Eq. (2), calculate the glare factor from L using Eq. (4) and Eq. (5), and then calculated $JND_G$ from $JND_L$ and the glare factor using Eq. (3). When the video signal is represented in other formats, the color space conversion can be adapted, for example using the one defined in SMPTE BT709.

Knowing the transfer function used to transform the input video into a perceptual space before encoding, a quantization ratio can be computed for a pixel (330) as follows:

$$Qr(p)=\max\{1, 1/2[TF(L(p)+JND_G(p))-TF(L(p)-JND_G(p))]\}. \quad (7)$$

Originally, the OETF was designed such that a step of JND in the linear space is no less than a step of 1 in the perceptual space. Here, we compute how much more we can quantize the pixel without any noticeable difference when we consider the glare masking effect. In particular, we take a $JND_G$ above the L value ($TF(L(p)+JND_G(p))$) and a $JND_G$ below the L value ($TF(L(p)-JND_G(p))$). Then we transfer both values to the perceptual space, using TF to obtain $TF(L(p)+JND_G(p))$ and $TF(L(p)-JND_G(p))$. The difference between the two values in the perceptual space is averaged to represent the distortion that can be tolerated in the perceptual space. Subsequently, we consider that quantization can be scaled up based on the averaged difference $1/2[TF(L(p)+JND_G(p))-TF(L(p)-JND_G(p))]$. That is, the averaged difference be used as the quantization ratio to adjust the quantization parameter in the forward conversion or during the encoding.

Other variations of calculating the quantization ratio can be:

$$Qr(p)=\max\{1, \max[TF(L(p)+JND_G(p)), TF(L(p)-JND_G(p)))]\} \quad (8)$$

or $$Qr(p)=\max\{1, \min[TF(L(p)+JND_G(p)), TF(L(p)-JND_G(p)))]\} \quad (9)$$

For a $JND_G$ equal to the $JND_L$, the resulting Qr should be equal to 1, as the OETF function was designed to be under the $JND_L$. Pixels affected by glare masking are associated with a glare factor greater than 1, and the resulting Qr is also greater than 1.

Figure 4:
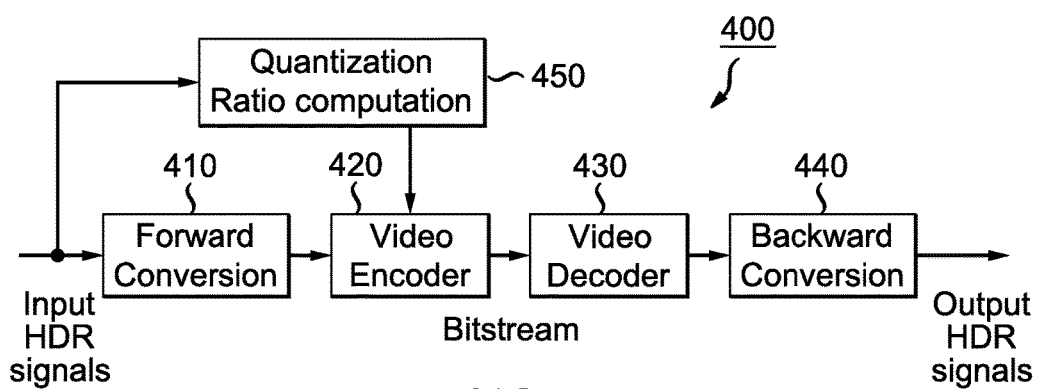
FIG. 4 illustrates an exemplary framework for encoding an HDR image considering the glare masking effect, according to an embodiment of the present principles.

FIG. 4 illustrates an exemplary method 400 for encoding an HDR image considering the glare masking effect, according to an embodiment of the present principles. In this embodiment, the glare masking effect is used to adjust the quantization step size. Specifically, quantization ratios for individual pixels can be calculated (450), for example, using method 300. The input HDR signals are converted to signals that can be accepted by a video encoder using forward conversion (410). During encoding (420), the quantization step size is adjusted based on the quantization ratio. Since video encoding usually proceeds in a block basis, we further calculate the quantization ratio for a block using the quantization ratios calculated for individual pixels. Here the size of a block depends on how we apply the quantization ratio. For example, the block may corresponds to one or more macroblocks in H.264/AVC, or one or more transform units (TUs) in HEVC.

In one embodiment, the quantization ratio for a block can be calculated using the max function of the quantization ratios of pixels within the block. That is, the maximum quantization ratio for the pixels in the block is used as the quantization ratio for the block. This approach may improve the compression performance at a cost of the visual quality.

In another embodiment, the quantization ratio for a block can be calculated using the minimum function, which may better preserve visual quality of the block. In yet another embodiment, the median or average of the quantization ratios can be used as the quantization ratio for the block, which may provide a balance between the compression efficiency and visual quality.

Assuming that the original quantization step size the encoder chooses without considering glare masking is $Q_1$ for a given block, the quantization step size with the proposed quantization adjustment can be calculated as:

$$Q_2=\min(Q_{max}, Qr*Q_1) \quad (10)$$

where $Q_{max}$ is the upper limit of the quantization step size. Conceptually, given the quantization step size $Q_2$, a transform coefficient T can be quantized as: $\lfloor(|T|+O)/Q_2\rfloor$, wherein O is a quantization rounding offset. Other quantization parameters, such as quantization matrix can also be used during quantization.

Depending on the codec, the value of $Q_2$ might be further adapted. Different codecs have different constraints on the quantization step size that can be set for a block. For example, in VP9, only a limited number of different quantization step sizes (Qps) are available. In this case, an additional process of Qp clustering can be performed. In HEVC, a delta Qp is encoded instead, limiting the possible value of $Q_2$.

It should be noted that the quantization may not be performed independently as a separate step within the encoder. For example, the quantization may be integrated with the transform. Further there might be other constraints on the value the quantization parameter in order to limit the range of quantization variations or to use integer implementations. Thus, the quantization step size may be processed before being used for quantization. Also when the quantization parameter is to be encoded, they may be mapped to a quantization index before being encoded. For ease of notation, we refer to different representations corresponding to the quantization step size as the quantization step size.

The quantization ratio adjustment in method 400 can also be viewed as a pre-processing step to improve the video encoding. At the decoding side, the bitstream is decoded (430) and then converted to HDR signals through backward conversion (440).

Figure 5:
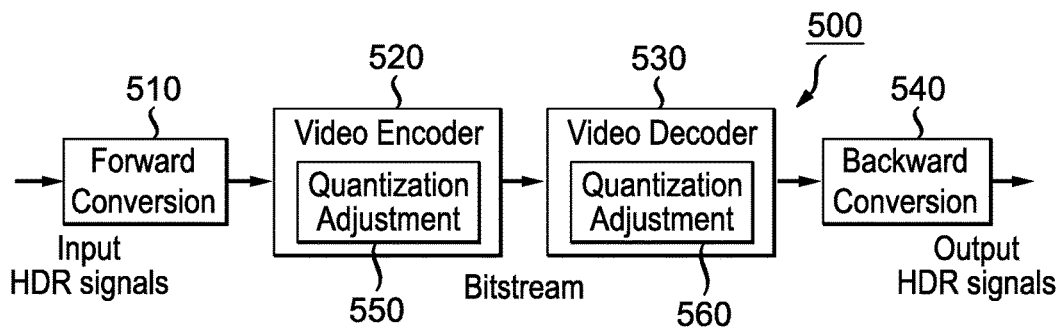
FIG. 5 illustrates another exemplary framework for encoding an HDR image considering the glare masking effect, according to an embodiment of the present principles.

FIG. 5 illustrates another exemplary method 500 for encoding an HDR image considering the glare masking effect, according to an embodiment of the present principles. In this embodiment, the glare masking effect is used to adjust the quantization step size that does not require the transmission of the quantization ratio, that is, the quantization ratio based on the glare masking can be deduced on the decoder. The quantization adjustment is performed in both the encoder and decoder, and the process of deriving the quantization ratio is the same at the encoder and decoder.

Figure 6:
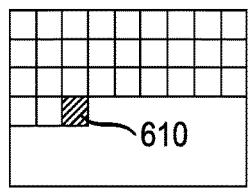
FIG. 6 is a pictorial example illustrating exemplary causal areas of a current block.

FIG. 6 illustrates an exemplary causal area (an area that is already encoded or decoded, and the pixels are available) of a current block 610. The causal area in this example includes the blocks to the left and above of the current block.

We adjust the computation of the glare factor since only the reconstructed pixels in the causal area are available at the decoder side. Thus, only the causal area will be considered when determining the neighbor for a pixel or a block. As discussed before, neighbors can furthermore be restricted to pixels with brightness above a threshold and pixels within a distance.

Referring back to FIG. 5, after the input HDR signals are transformed using forward conversion (510), the video encoder (520) encodes the converted signals, using quantization adjustment (550) based on glare masking. At the decoder side, the video decoder (530) decodes the bitstream, using quantization adjustment (560) based on glare masking. The decoded signals are then converted to output HDR signals using backward conversion (540).

In the following, we use an HEVC encoder/decoder to illustrate the quantization adjustment applied in the video encoder and decoder. It should be noted the proposed quantization adjustment can be used with other video compression standards.

Figure 7:
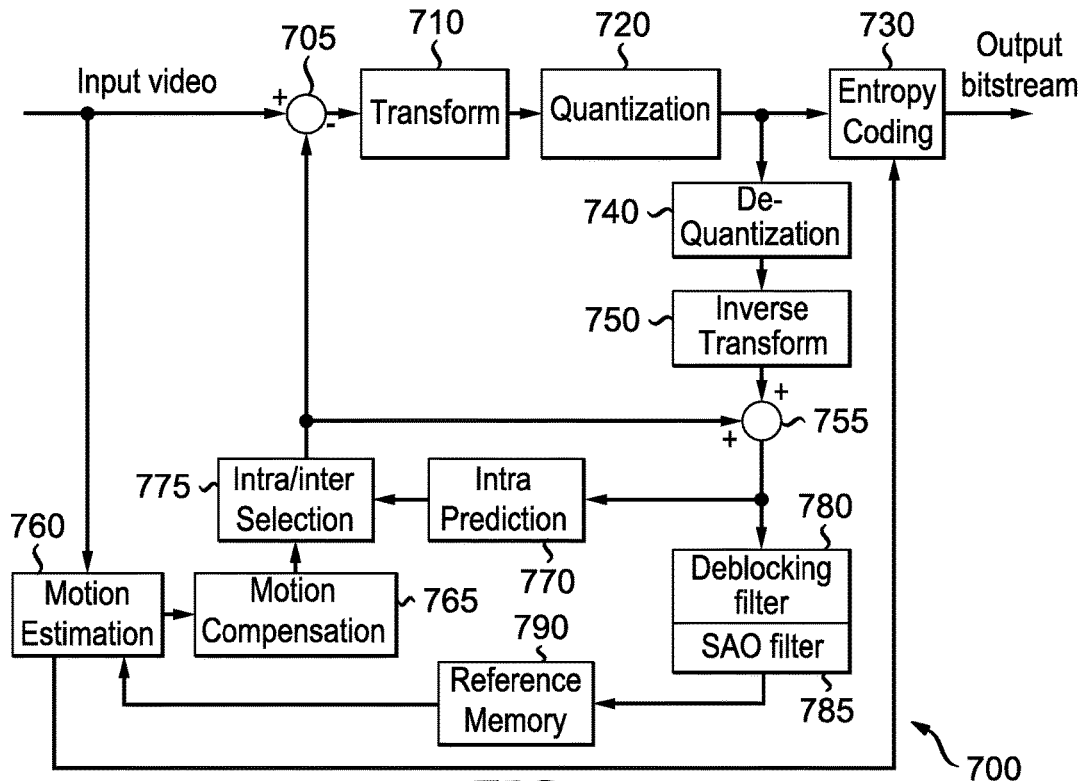
FIG. 7 is a pictorial example illustrating an exemplary HEVC encoder.

FIG. 7 illustrates an exemplary HEVC encoder 700 wherein the present principles may be applied. The input of encoder 700 includes a video to be encoded. In the exemplary encoder 700, when a block is encoded in an intra mode, it performs intra prediction (770). In an inter mode, the block performs motion estimation (760) and motion compensation (765). The encoder decides which one of the intra mode or inter mode to use for encoding the block (775), and prediction residuals are calculated by subtracting the predicted block from the original image block (705).

The prediction residuals are transformed (710) and quantized (720). The quantized transform coefficients, as well as motion vectors and other syntax elements, are entropy coded (730) to generate a bitstream. The encoder decodes an encoded block to provide a reference for further predictions. The quantized transform coefficients are de-quantized (740) and inverse transformed (750) to decode prediction residuals. Combining the decoded prediction residuals and the predicted block (755), an image block is reconstructed. A deblocking filter (780) and SAO (Sample Adaptive Offset) filter (785) are applied to the reconstructed block. The filtered image is stored at a reference memory (790).

Figure 8:
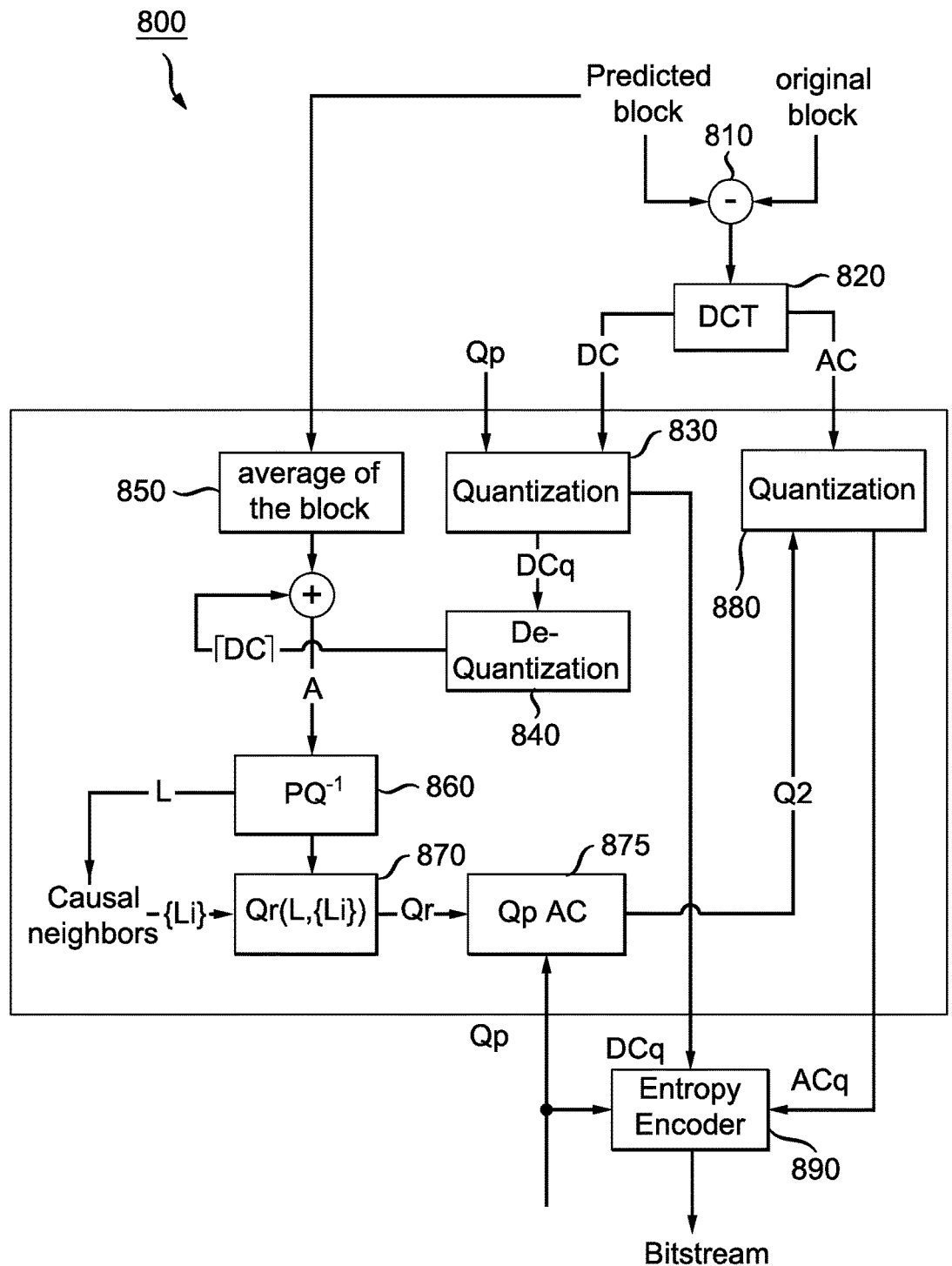
FIG. 8 illustrates an exemplary method for adjusting the quantization parameter in a video encoder, according to an embodiment of the present principles.

FIG. 8 illustrates an exemplary method 800 for adjusting the quantization parameter in a video encoder, according to an embodiment of the present principles. Method 800 may be used in the quantization module (720) of encoder 700. In this embodiment, we assume the DC coefficient and AC coefficients are quantized at two stages, wherein the DC coefficient is quantized using a quantization step size $Qp=Q_1$ without considering glare masking. $Q_1$ can be decided by a rate control algorithm to meet the bitrate constraint, and can vary from block to block and from picture to picture. Then the DC coefficient is used to estimate the luminance and estimate the glare factor for the current block. Subsequently, the AC coefficients are quantized based on adjusted quantization step size $Q_2$.

The input to method 800 includes an original block (B) and a corresponding predicted block (P). A predicted block can be from, for example, intra prediction, or motion compensation. A residual of the current block can be formed (810) as: R=B−P. The residual block is transformed (820) as T=DCT(R).

The DC coefficient is quantized (830) using the quantization step size $Q_1$ without considering glare masking: $C(DC)=D(DC,Q_1)$, wherein DC is the DC coefficient, D(.) denotes the quantization, and C is the quantized transform coefficient. The quantized transform coefficient is then de-quantized (840) as:

$$[DC]=D^{-1}(D(DC,Q_1)), \quad (11)$$

where [DC] is the reconstructed DC coefficient. We then estimate the intensity of the block using the average of the predicted block (850) and the reconstructed DC coefficient, according to:

$$A = \frac{1}{N}\sum_i P(i) + [DC], \quad (12)$$

where P(i) is the intensity of each pixel from the predicted block, N is the number of pixels in the block, and A is the estimate average luminance of the block.

The estimated luminance value A is used as the current value for the whole block and the glare factor is computed, using only the causal part of the image for the current block. At this point, the luminance value of reconstructed pixels from the causal part can be used.

Because the glare factor may be computed using luminance in the linear space, the estimated luminance for the block and the luminance of the neighboring causal blocks may be converted back to the linear space using an inverse OETF (860, $L=OETF^{-1}(A)$). A quantization ratio (Qr) can then be estimated (870) based on the estimated luminance values for the current block (L) and the causal blocks ($\{L_i\}$). In particular, the glare factor for a block can be computed as $$Gf(B)=\min(M,\Sigma_{Bi}N^2*Gf(B,Bi)) \quad (13)$$

where $\{Bi\}$ are the neighboring blocks, and Gf(B,Bi) is the glare factor between blocks B and Bi. The glare factor calculation is similar to the one between pixels, but using block centers to compute the distance between the blocks, and using the average luminance of the block instead of pixels' luminance.

Using the quantization ratio and the quantization step size $Qp=Q_1$, a quantization step size $Q_2$ for AC coefficients can be calculated (875) as $Q_2=Qr*Q_1$. Subsequently, the AC coefficients are quantized (880). The quantization step size Qp, quantized DC coefficient ($DC_q$) and AC coefficients ($AC_q$) can then be entropy encoded (890) to be included in the bitstream. It should be noted that the quantization ratio (Qr) is not transmitted in the bitstream, rather, it will be derived at the decoder.

Figure 9:
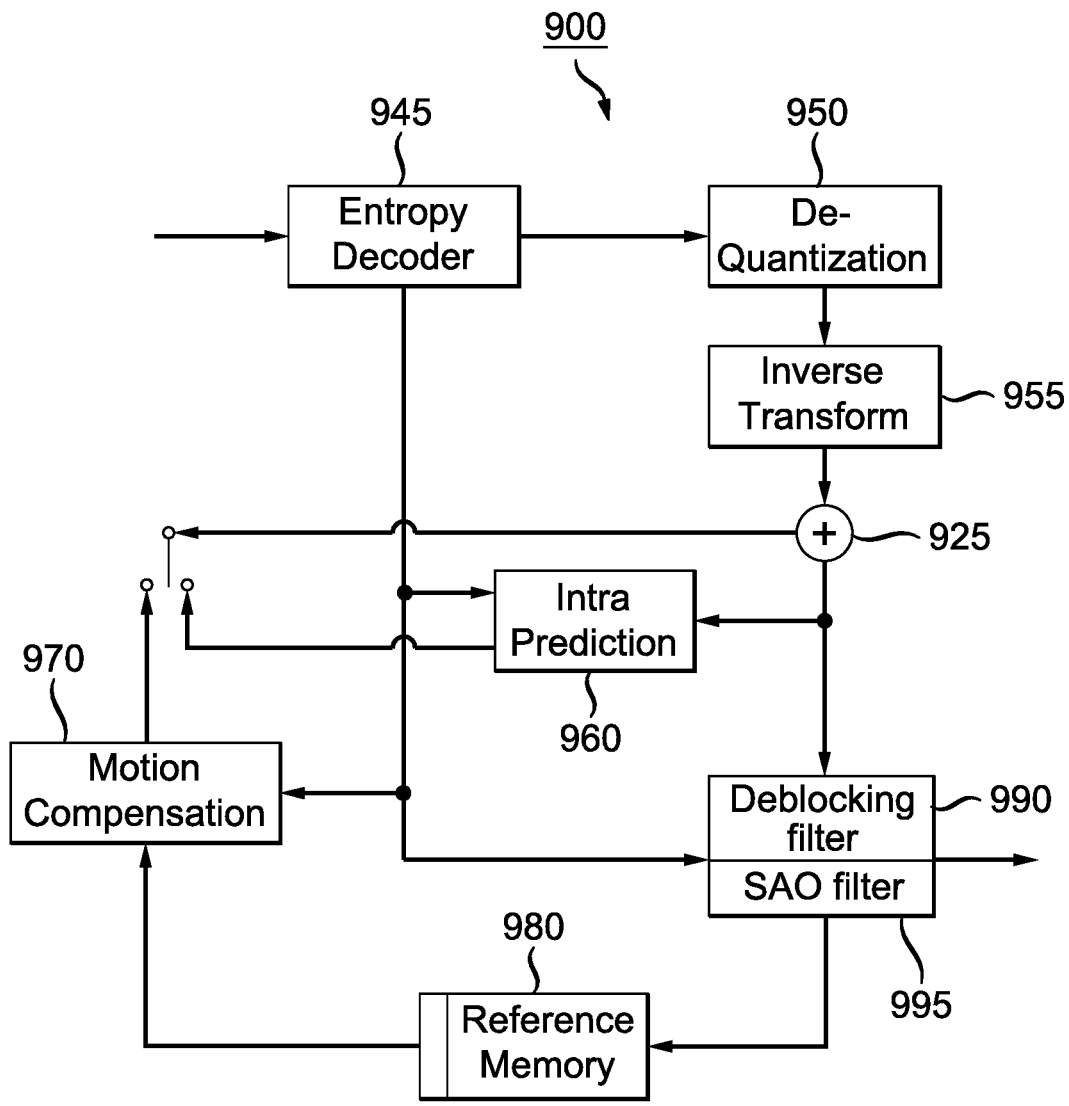
FIG. 9 is a pictorial example illustrating an exemplary HEVC decoder.

FIG. 9 depicts a block diagram of an exemplary HEVC video decoder 900 wherein the present principles may be applied. The input of decoder 900 includes a video bitstream, which may be generated by video encoder 700. The bitstream is first entropy decoded (945) to obtain transform coefficients, motion vectors, and other coded information. The transform coefficients are de-quantized (950) and inverse transformed (955) to decode the prediction residuals. Combining the decoded prediction residuals and the predicted block (925), an image block is reconstructed. The predicted block may be obtained from intra prediction (960) or motion-compensated prediction (970). A deblocking filter (990) and a SAO filter (995) are applied to the reconstructed block or the reconstructed image. The filtered image is stored at a reference memory (980).

Figure 10:
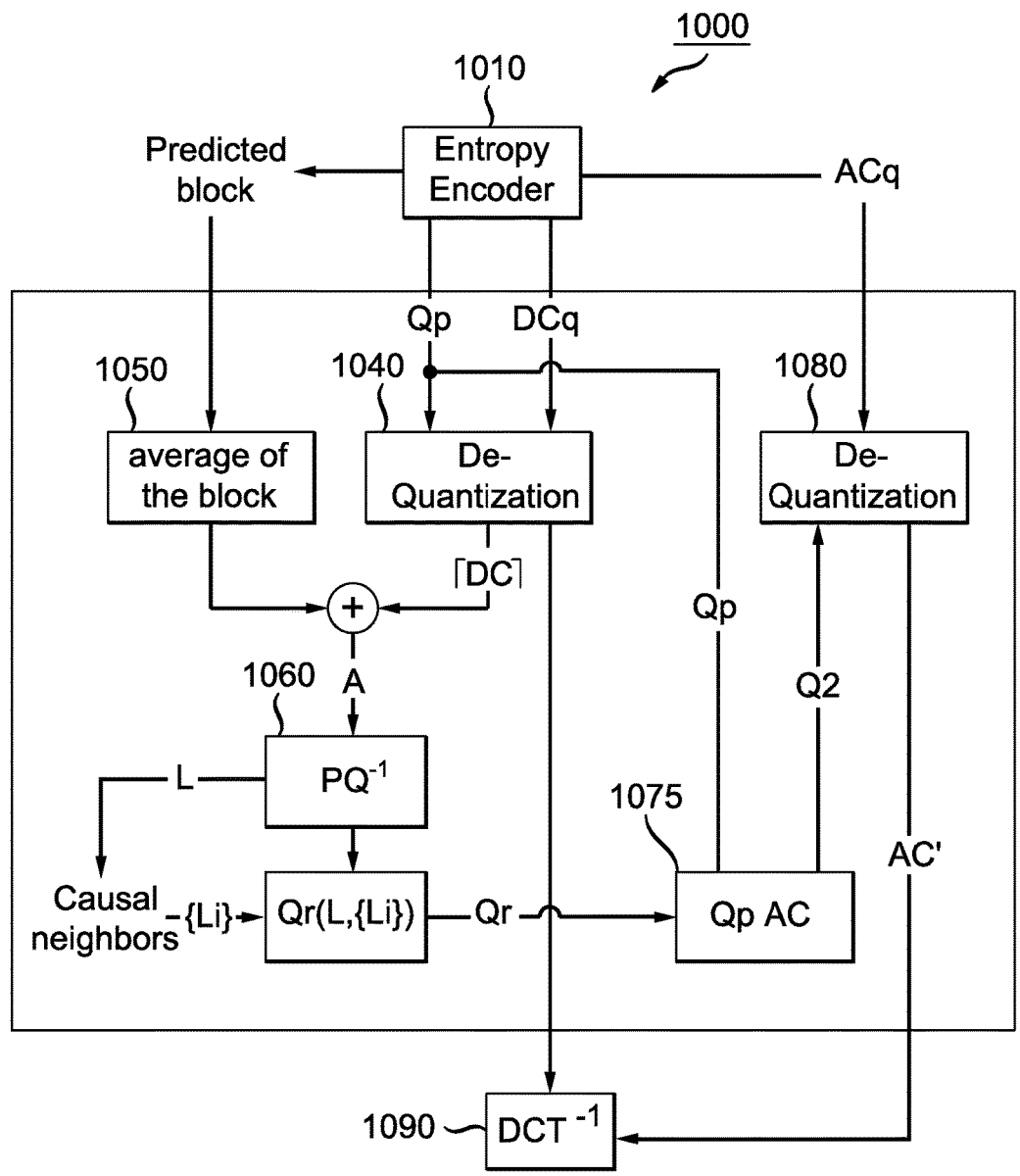
FIG. 10 illustrates an exemplary method for adjusting the quantization parameter in a video decoder, according to an embodiment of the present principles.

FIG. 10 illustrates an exemplary method 1000 for adjusting the quantization parameter in a decoder, according to an embodiment of the present principles. Method 1000 may be used in the de-quantization module (950) of decoder 900. Similar to method 800, we assume the DC coefficient and AC coefficients are de-quantized at two stages, wherein the DC coefficient is de-quantized using a quantization step size $Qp=Q_1$ decoded from the bitstream. Then the DC coefficient is used to estimate the luminance and estimate the glare factor for the current block. Subsequently, the AC coefficients are de-quantized based on adjusted quantization step size $Q_2$.

predicted block (P) can be from, for example, intra prediction, or motion compensation. The DC coefficient ($DC_q$), AC coefficients ($AC_q$), and the quantization step size for the block ($Qp=Q_1$) can be obtained from an entropy decoder (1010). The DC coefficient is de-quantized (1040) using the quantization step size $Q_1$ as:

$$[DC]=D^{-1}(DC_q,Q_1) \quad (14)$$

where [DC] is the reconstructed DC coefficient. We then estimate the intensity of the block using the average of the predicted block (1050) and the decoded DC coefficient, according to:

$$A = \frac{1}{N}\sum_i P(i) + \lceil DC \rceil \quad (15)$$

where P(i) is the intensity of each pixel from the predicted block, N is the number of pixels in the block, and A is the estimate average luminance of the block.

The estimated luminance value A is used as the current value for the whole block and the glare factor is computed, using only the causal part of the image for the current block. At this point, the luminance value of decoded pixels from the causal part can be used.

Because the glare factor may be computed using luminance in the linear space, the estimated luminance for the block and the luminance of the neighboring causal blocks may be converted back to the linear space using an inverse OETF (1060, $L=OETF^{-1}(A)$). A quantization ratio (Qr) can then be estimated (1070) based on the estimated luminance values for the current block (L) and the causal blocks ($\{L_i\}$).

Using the quantization ratio and the quantization step size $Qp=Q_1$, a quantization step size $Q_2$ for AC coefficients can be calculated (1075) as $Q_2=Qr*Q_1$. Subsequently, the AC coefficients are de-quantized (1080). The de-quantized DC coefficient and AC coefficients can then be inverse transformed (1090). It should be noted that the quantization ratio (Qr) is not received in the bitstream, rather, it is derived at the decoder.

Note that the quantization ratio calculation performed in the encoder and decoder should correspond to each other. For example, the steps of 1040-1075 performed in method 1000 correspond to the steps of 840-875 in method 800, respectively.

Since the adapted quantization can be deduced on the decoder's side to avoid transmitting the adaptive quantization ratios, the present embodiments may improve video coding efficiency. The adaptive quantization of each block also takes into consideration the masking effect and may also improve the visual quality.

In the above, we discussed that the quantization step size can be adjusted by taking into account the glare masking effect. Other quantization parameters, such as quantization round offset and quantization matrix can also be adjusted according to the present principles. For example, the quantization matrix can be scaled using the quantization ratio, or the quantization rounding offset may be shifted or scaled based on the quantization ratio.

It should be noted that while the glare masking effect is discussed when adjusting the quantization parameters, the present principles can be applied to other scenarios where the perception of a block or area is affected by the surrounding areas or blocks, for example, but not limited to, in color perception or texture perception.

We show examples in the context of HDR videos since glare masking is more evident is HDR videos. However, the current displays can have very high contrast ratio and may present similar problems as HDR videos. Thus, the glare masking effect can also be considered for SDR videos and the present principles can be applied when encoding and decoding SDR videos. In particular, if the glare masking is caused by the display, for example, by the high contrast ratio of the display, we may also need to consider the display characteristics when designing the quantization adjustment.

Figure 11:
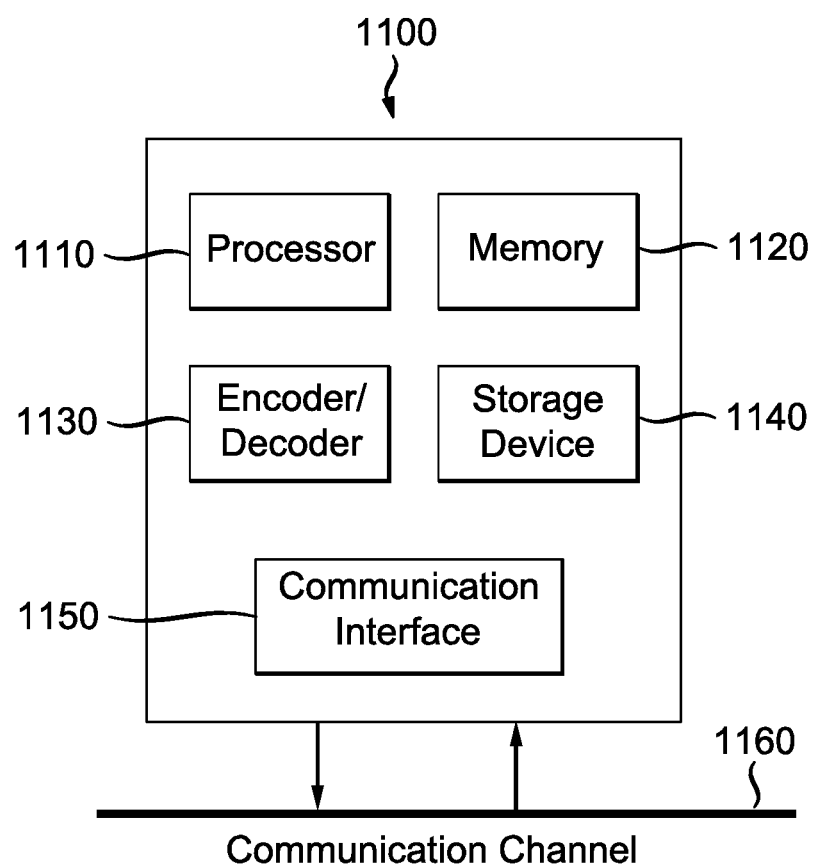
FIG. 11 illustrates a block diagram depicting an exemplary system in which various aspects of the exemplary embodiments of the present principles may be implemented.

FIG. 11 illustrates a block diagram of an exemplary system in which various aspects of the exemplary embodiments of the present principles may be implemented. System 1100 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1100 may be communicatively coupled to other similar systems, and to a display via a communication channel as shown in FIG. 11 and as known by those skilled in the art to implement the exemplary video system described above.

The system 1100 may include at least one processor 1110 configured to execute instructions loaded therein for implementing the various processes as discussed above. Processor 1110 may include embedded memory, input output interface and various other circuitries as known in the art. The system 1100 may also include at least one memory 1120 (e.g., a volatile memory device, a non-volatile memory device). System 1100 may additionally include a storage device 1140, which may include non-volatile memory, including, but not limited to, EEPROM, ROM, PROM, RAM, DRAM, SRAM, flash, magnetic disk drive, and/or optical disk drive. The storage device 1140 may comprise an internal storage device, an attached storage device and/or a network accessible storage device, as non-limiting examples. System 1100 may also include an encoder/decoder module 1130 configured to process data to provide an encoded video or decoded video.

Encoder/decoder module 1130 represents the module(s) that may be included in a device to perform the encoding and/or decoding functions. As is known, a device may include one or both of the encoding and decoding modules. Additionally, encoder/decoder module 1130 may be implemented as a separate element of system 1100 or may be incorporated within processors 1110 as a combination of hardware and software as known to those skilled in the art.

Program code to be loaded onto processors 1110 to perform the various processes described hereinabove may be stored in storage device 1140 and subsequently loaded onto memory 1120 for execution by processors 1110. In accordance with the exemplary embodiments of the present principles, one or more of the processor(s) 1110, memory 1120, storage device 1140 and encoder/decoder module 1130 may store one or more of the various items during the performance of the processes discussed herein above, including, but not limited to the HDR video, the bitstream, equations, formula, matrices, variables, operations, and operational logic.

The system 1100 may also include communication interface 1150 that enables communication with other devices via communication channel 1160. The communication interface 1150 may include, but is not limited to a transceiver configured to transmit and receive data from communication channel 1160. The communication interface may include, but is not limited to, a modem or network card and the communication channel may be implemented within a wired and/or wireless medium. The various components of system 1100 may be connected or communicatively coupled together using various suitable connections, including, but not limited to internal buses, wires, and printed circuit boards.

The exemplary embodiments according to the present principles may be carried out by computer software implemented by the processor 1110 or by hardware, or by a combination of hardware and software. As a non-limiting example, the exemplary embodiments according to the present principles may be implemented by one or more integrated circuits. The memory 1120 may be of any type appropriate to the technical environment and may be implemented using any appropriate data storage technology, such as optical memory devices, magnetic memory devices, semiconductor-based memory devices, fixed memory and removable memory, as non-limiting examples. The processor 1110 may be of any type appropriate to the technical environment, and may encompass one or more of microprocessors, general purpose computers, special purpose computers and processors based on a multi-core architecture, as non-limiting examples.

Figure 12:
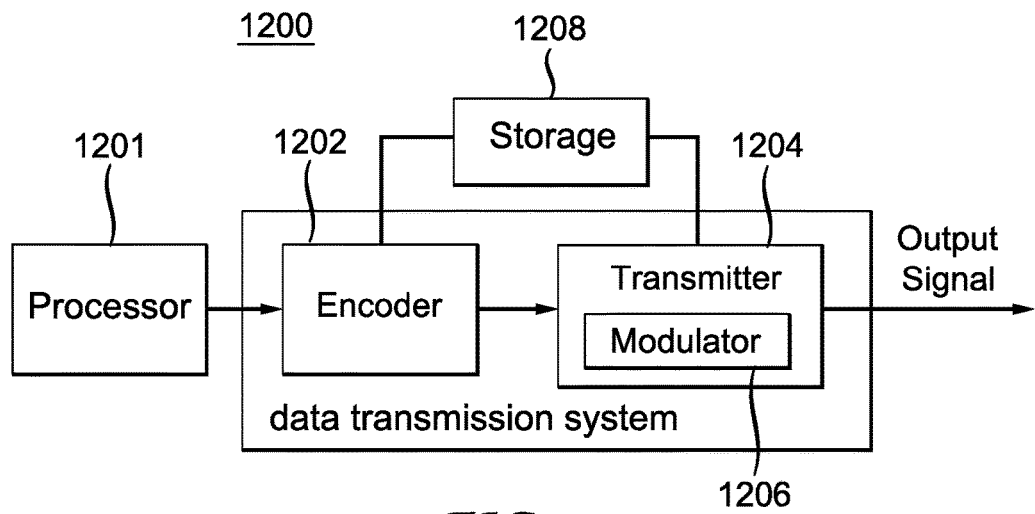
FIG. 12 illustrates a block diagram depicting an example of a video processing system that may be used with one or more implementations.

Referring to FIG. 12, a data transmission system 1200 is shown, to which the features and principles described above may be applied. The data transmission system 1200 may be, for example, a head-end or transmission system for transmitting a signal using any of a variety of media, such as, satellite, cable, telephone-line, or terrestrial broadcast. The data transmission system 1200 also may be used to provide a signal for storage. The transmission may be provided over the Internet or some other network. The data transmission system 1200 is capable of generating and delivering, for example, video content and other content.

The data transmission system 1200 receives processed data and other information from a processor 1201. In one implementation, the processor 1201 performs forward conversion. The processor 1201 may also provide metadata to 1200 indicating, for example, the format of the video.

The data transmission system or apparatus 1200 includes an encoder 1202 and a transmitter 1204 capable of transmitting the encoded signal. The encoder 1202 receives data information from the processor 1201. The encoder 1202 generates an encoded signal(s).

The encoder 1202 may include sub-modules, including for example an assembly unit for receiving and assembling various pieces of information into a structured format for storage or transmission. The various pieces of information may include, for example, coded or uncoded video, and coded or uncoded elements. In some implementations, the encoder 1202 includes the processor 1201 and therefore performs the operations of the processor 1201.

The transmitter 1204 receives the encoded signal(s) from the encoder 1202 and transmits the encoded signal(s) in one or more output signals. The transmitter 1204 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 1206. The transmitter 1204 may include, or interface with, an antenna (not shown). Further, implementations of the transmitter 1204 may be limited to the modulator 1206.

The data transmission system 1200 is also communicatively coupled to a storage unit 1208. In one implementation, the storage unit 1208 is coupled to the encoder 1202, and stores an encoded bitstream from the encoder 1202. In another implementation, the storage unit 1208 is coupled to the transmitter 1204, and stores a bitstream from the transmitter 1204. The bitstream from the transmitter 1204 may include, for example, one or more encoded bitstreams that have been further processed by the transmitter 1204. The storage unit 1208 is, in different implementations, one or more of a standard DVD, a Blu-Ray disc, a hard drive, or some other storage device.

Figure 13:
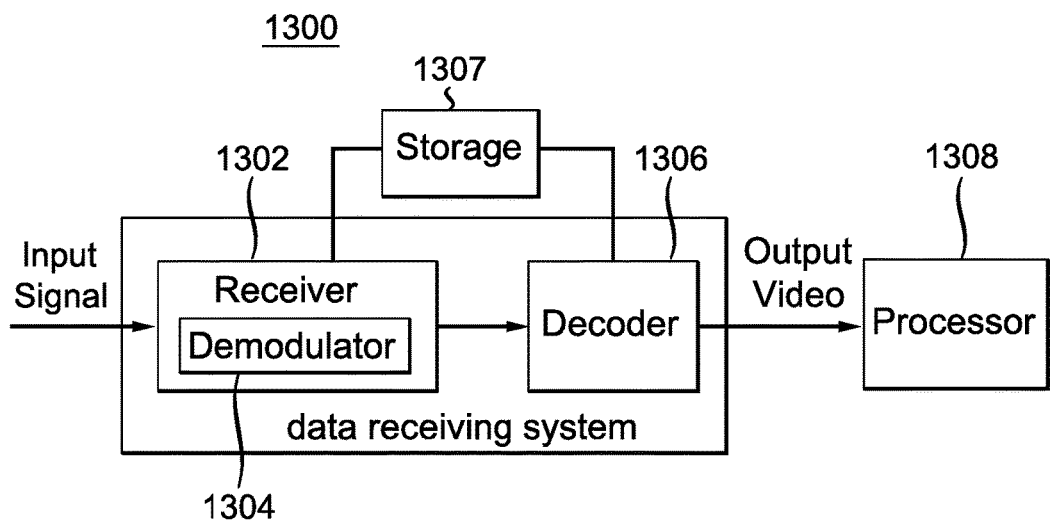
FIG. 13 illustrates a block diagram depicting another example of a video processing system that may be used with one or more implementations.

Referring to FIG. 13, a data receiving system 1300 is shown to which the features and principles described above may be applied. The data receiving system 1300 may be configured to receive signals over a variety of media, such as storage device, satellite, cable, telephone-line, or terrestrial broadcast. The signals may be received over the Internet or some other network.

The data receiving system 1300 may be, for example, a cell-phone, a computer, a set-top box, a television, or other device that receives encoded video and provides, for example, decoded video signal for display (display to a user, for example), for processing, or for storage. Thus, the data receiving system 1300 may provide its output to, for example, a screen of a television, a computer monitor, a computer (for storage, processing, or display), or some other storage, processing, or display device.

The data receiving system 1300 is capable of receiving and processing data information. The data receiving system or apparatus 1300 includes a receiver 1302 for receiving an encoded signal, such as, for example, the signals described in the implementations of this application. The receiver 1302 may receive, for example, a signal providing a bitstream, or a signal output from the data transmission system 1200 of FIG. 12.

The receiver 1302 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 1304, de-randomizing the energy in the signal, de-interleaving the data in the signal, and error-correction decoding the signal. The receiver 1302 may include, or interface with, an antenna (not shown). Implementations of the receiver 1302 may be limited to the demodulator 1304.

The data receiving system 1300 includes a decoder 1306. The receiver 1302 provides a received signal to the decoder 1306. The signal provided to the decoder 1306 by the receiver 1302 may include one or more encoded bitstreams. The decoder 1306 outputs a decoded signal, such as, for example, decoded video signals including video information.

The data receiving system or apparatus 1300 is also communicatively coupled to a storage unit 1307. In one implementation, the storage unit 1307 is coupled to the receiver 1302, and the receiver 1302 accesses a bitstream from the storage unit 1307. In another implementation, the storage unit 1307 is coupled to the decoder 1306, and the decoder 1306 accesses a bitstream from the storage unit 1307. The bitstream accessed from the storage unit 1307 includes, in different implementations, one or more encoded bitstreams. The storage unit 1307 is, in different implementations, one or more of a standard DVD, a Blu-Ray disc, a hard drive, or some other storage device.

The output data from the decoder 1306 is provided, in one implementation, to a processor 1308. The processor 1308 is, in one implementation, a processor configured for performing post-processing. In some implementations, the decoder 1306 includes the processor 1308 and therefore performs the operations of the processor 1308. In other implementations, the processor 1308 is part of a downstream device such as, for example, a set-top box or a television.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of encoding a video, comprising:
accessing a quantization parameter and a residual block corresponding to a block of an image of said video;
transforming said residual block to form a DC transform coefficient and one or more AC transform coefficients;
quantizing and de-quantizing said DC transform coefficient responsive to said quantization parameter, to form a reconstructed DC transform coefficient;
adjusting said quantization parameter of said block responsive to said reconstructed DC transform coefficient and luminance of one or more neighboring reconstructed blocks of said block; and
encoding said one or more AC transform coefficients responsive to said adjusted quantization parameter.

2. The method of claim 1, wherein said quantization parameter is adjusted based on a glare masking effect between said neighboring reconstructed blocks of said block and said block.

3. The method of claim 2, further comprising:
determining a JND (Just Noticeable Difference) for a pixel of said block responsive to said glare masking effect, wherein said quantization parameter is adjusted based on said determined JND and said luminance of said block.

4. The method of claim 1, wherein said quantization parameter is adjusted responsive to a sum of said reconstructed DC transform coefficient of said block and a predicted block for said block.

5. The method of claim 4, wherein quantization of said AC transform coefficients of said block is based on said adjusted quantization parameter.

6. The method of claim 4, further comprising:
determining a quantization ratio based on said sum of said block and said luminance of said neighboring reconstructed blocks of said block, wherein said quantization parameter is adjusted based on said quantization ratio.

7. A method of decoding a video, comprising:
accessing a quantization parameter of a block of an image;
accessing transform coefficients for said block of said image, said transform coefficients including a DC transform coefficient and one or more AC transform coefficients;
de-quantizing said DC transform coefficient responsive to said quantization parameter to form a reconstructed DC transform coefficient;
adjusting said quantization parameter responsive to said reconstructed DC transform coefficient and luminance of one or more neighboring reconstructed blocks of said block; and
decoding said one or more AC transform coefficients responsive to said adjusted quantization parameter.

8. The method of claim 7, wherein said quantization parameter is adjusted based on a sum of said reconstructed DC transform coefficient of said block and a predicted block for said block.

9. The method of claim 8, wherein de-quantization of said AC transform coefficients of said block is based on said adjusted quantization parameter.

10. The method of claim 8, further comprising:
determining a quantization ratio based on said sum and said luminance of said neighboring reconstructed blocks of said block, wherein said quantization parameter is adjusted based on said quantization ratio.

11. An apparatus for encoding a video, comprising at least a memory and one or more processors, wherein said one or more processors are configured to:
access a quantization parameter and a residual block corresponding to a block of an image of said video;
transform said residual block to form a DC transform coefficient and one or more AC transform coefficients;
quantize and de-quantize said DC transform coefficient responsive to said quantization parameter, to form a reconstructed DC transform coefficient;
adjust said quantization parameter of said block responsive to said reconstructed DC transform coefficient and luminance of one or more neighboring reconstructed blocks of said block; and
encode said one or more AC transform coefficients responsive to said adjusted quantization parameter.

12. The apparatus of claim 11, wherein said quantization parameter is adjusted based on a glare masking effect between said neighboring reconstructed blocks of said block and said block.

13. The apparatus of claim 12, further comprising:
determining a JND (Just Noticeable Difference) for a pixel of said block responsive to said glare masking effect, wherein said quantization parameter is adjusted based on said determined JND and said luminance of said block.

14. The apparatus of claim 11, wherein said quantization parameter is adjusted responsive to a sum of said reconstructed DC transform coefficient of said block and a predicted block for said block.

15. The apparatus of claim 14, wherein quantization of said AC transform coefficients of said block is based on said adjusted quantization parameter.

16. The apparatus of claim 14, wherein said one or more processors are further configured to:
determining a quantization ratio based on said sum and said luminance of said neighboring reconstructed blocks of said block, wherein said quantization parameter is adjusted based on said quantization ratio.

17. An apparatus for decoding a video, comprising at least a memory and one or more processors, wherein said one or more processors are configured to:
access a quantization parameter of a block of an image;
access transform coefficients for said block of said image, said transform coefficients including a DC transform coefficient and one or more AC transform coefficients;
decode said DC transform coefficient responsive to said quantization parameter to form a reconstructed DC transform coefficient;
adjust said quantization parameter responsive to said reconstructed DC transform coefficient and luminance of one or more neighboring reconstructed blocks of said block; and
de-quantize said one or more AC transform coefficients responsive to said adjusted quantization parameter.

18. The apparatus of claim 17, wherein said quantization parameter is adjusted based on a sum of said reconstructed DC transform coefficient of said block and a predicted block for said block.

19. The apparatus of claim 18, wherein de-quantization of said AC transform coefficients of said block is based on said adjusted quantization parameter.

20. The apparatus of claim 18, wherein said one or more processors are further configured to:
determine a quantization ratio based on said sum and said luminance of said neighboring blocks of said block, wherein said quantization parameter is adjusted based on said quantization ratio.

* * * * *